United States Patent [19]
Gebhardt et al.

[11] Patent Number: 4,971,179
[45] Date of Patent: Nov. 20, 1990

[54] BRAKE DEVICE FOR RAIL VEHICLES OR TRAINS

[75] Inventors: Hannes Gebhardt, Garching; Kaspar Gehr, Kirchheim; Eckart Saumweber, Gauting, all of Fed. Rep. of Germany

[73] Assignee: Knorr-Bremse AG, Munich, Fed. Rep. of Germany

[21] Appl. No.: 383,495

[22] Filed: Jul. 24, 1989

[30] Foreign Application Priority Data

Jul. 22, 1988 [DE] Fed. Rep. of Germany ....... 3824985

[51] Int. Cl.⁵ .............................................. B60T 8/26
[52] U.S. Cl. ...................................... 188/33; 188/158; 303/1; 303/20
[58] Field of Search ................ 188/3 R, 3 H, 33, 155, 188/156, 158, 180, 181 A, 181 R; 303/1, 3, 15, 16, 20, 9.61, 9.62

[56] References Cited

U.S. PATENT DOCUMENTS

| | | | |
|---|---|---|---|
| 2,319,258 | 5/1943 | Penrose ................................ | 188/158 |
| 3,193,057 | 7/1965 | Rudqvist et al. .................... | 188/180 |
| 4,768,840 | 9/1988 | Sullivan et al. ..................... | 188/3 R |

*Primary Examiner*—Duane A. Reger
*Attorney, Agent, or Firm*—Pollock, Vande Sande & Priddy

[57] ABSTRACT

The braking device has several groups of brakes (22 to 25), which can be applied separately by a control device (35) and each of which has at least one friction brake (16 to 19). The control device (35) controls the application of the groups of brakes (22 25) depending on their wear condition and temperature, such that application of the least-worn group of brakes (20 to 25) is favored, whereby the friction brakes (16 to 19) of each of the applied groups of brakes (22 to 25) quickly attain an advantageous temperature range with respect to minimum wear, and are maintained in such range. The entire braking of the rail vehicle or train (1) is always maintained in addition in agreement with a braking requirement signal for the rail vehicle or train (1). This produces equal wear of all brake shoes (20), whereby the friction brakes (16 to 19) are always operated at a temperature range most advantageous for wear and with the most wear-advantageous pressure with moderate braking strength. Very weak application of the friction brakes (16 to 19), which could lead to glazing of the friction shoes (20), is avoided.

14 Claims, 1 Drawing Sheet

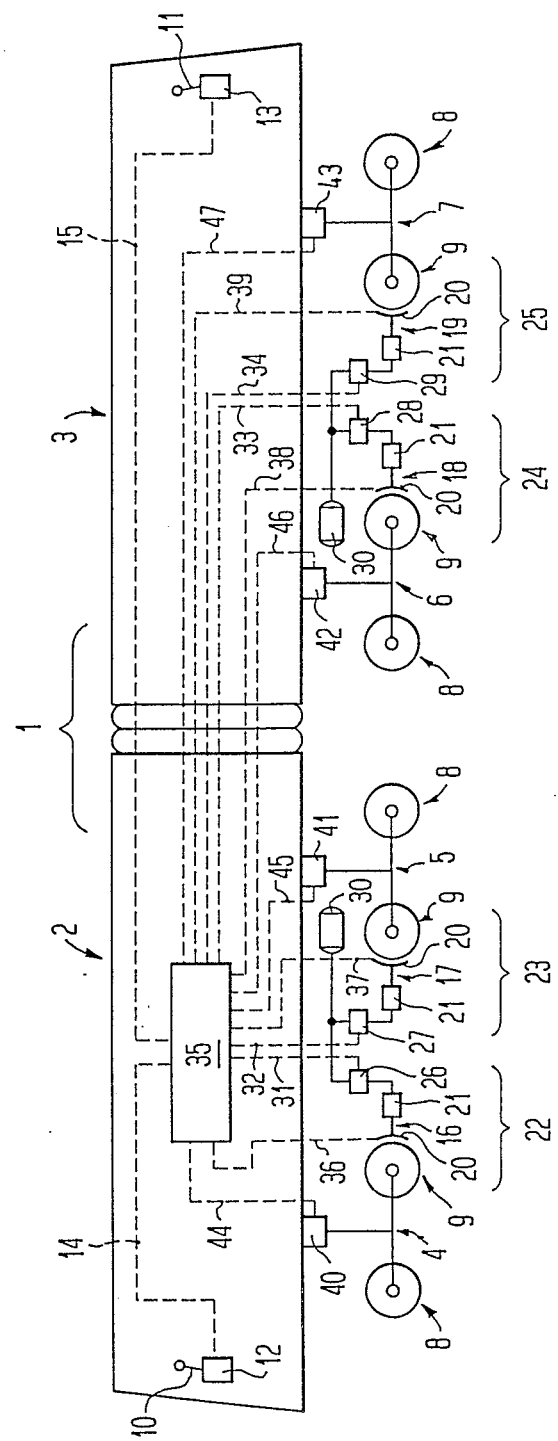

BRAKE DEVICE FOR RAIL VEHICLES OR TRAINS

FIELD OF THE INVENTION

The invention is a brake device for rail vehicles or trains with a number of wheels, the friction brakes allocated to the wheels being divided into separately applicable groups of brakes with a control device which processes a braking requirement signal for use as braking parameters for the rail vehicle or train, the measurement signals for the temperature, and the amount of friction and/or braking pressure of at least one friction brake of every group of brakes, and from these adjusts the special braking signals for the individual groups of brakes controlling the force application in such a manner that, by varying the brakes which are applied or the force with which they are applied, it avoids exceeding a predetermined temperature limit and simultaneously achieves a total braking effect corresponding to the braking requirement signal as the sum of the braking effects of the individual brake groups.

BACKGROUND OF THE INVENTION

Such a braking device is already disclosed in EP-A 247 253 with respect aircraft brakes, but it can also be applied to vehicle brakes. The groups of brakes in this reference are distributed to one or more shafts and are allocated to one or more wheels. The braking device works in such a way that at the beginning of a typical braking, a first group of brakes is applied, and when its temperature achieves the above-mentioned temperature limit, above which damage to the friction brakes could occur, the friction brakes of this first group of brakes are released and the friction brakes of a second brake group are then correspondingly applied. The friction brakes of the first group of brakes can now cool off, and if the friction brakes of the second group of brakes reach the temperature limit, the first group of brakes can be reapplied. Of course, more than two groups of brakes can be provided, in which case the individual groups of brakes are applied consecutively. If all available groups of brakes exceed the temperature limit, that brake group which has the lowest temperature is applied most strongly and the group of brakes which has the highest temperature is applied least strongly in order to achieve cumulatively the braking necessary corresponding to the braking requirement signal. In addition, the known braking device also has measurement devices to determine the achieved braking effect of the individual groups of brakes, which makes it possible to compensate with stronger application of other groups of brakes for drops in braking effectiveness caused, for example, by fading or loss of pressure. But with this known braking device there is still the chance that the friction brakes of the individual groups of brakes will wear out at different rates, so that finally the friction brakes of one group of brakes reach their wear limit while in other groups of brakes the friction brakes still have plenty of wear left. This causes a common, premature, and wasteful replacement of friction materials for the friction brakes of the entire aircraft or vehicle. Another deficiency of the known braking device is that the individual groups of brakes are each applied until they achieve the temperature limit for their friction brakes before they are released. There are, however, many known friction materials which exhibit very poor wear at both low and high temperatures with respect to the temperature limit in a temperature range which may be above 100° C. and up to about 250° C., but which on the other hand have only very limited wear with good friction and therefore braking effects. The friction brakes of the known braking device often work outside of this most advantageous (in terms of wear) temperature range for friction materials.

SUMMARY OF THE INVENTION

It is therefore an object of the invention to create a braking device of the type described, in such a manner that its friction brakes are operated as much as possible within the best temperature range for wear, but which at the same time ensures that no glazing occurs on the friction materials, as it does for frequent, weak braking.

The inventive braking device accomplishes this task in that the friction brakes have friction materials which have minimal specific abrasion values within a specified temperature range above 100° C., and in that the controls create the braking signals at least during an uninterrupted braking process in such a way that the friction brakes of all applied brake groups achieve and maintain a temperature which is within the specified temperature range and at most the temperature limit, and weak applications of the brake, which lead to glazing of the friction materials, are avoided.

Especially advantageous is a feature which achieves equal wear of all friction brakes in the braking device, so that it is necessary to replace friction materials for the entire braking device only if all of the friction brakes in the braking device have almost reached their final wear condition. Replacement work is therefore needed only relatively seldom and friction materials are not wasted.

BRIEF DESCRIPTION OF THE DRAWING

An example of a braking device constructed in accordance with the invention is schematically depicted in its essential parts in the single drawing figure.

DESCRIPTION OF THE PREFERRED EMBODIMENT

The drawing shows a train 1 which is composed of two close-coupled single cars 2 and 3. Each single car is equipped with two bogies 4, 5 or 6, 7, which each have two wheel sets 8 and 9. Each wheel set 8, 9 has the usual two wheels rigidly connected to each other by a shaft. In the engineer's cab of each of the single cars 2 and 3, with their front sides facing away from each other, there are transmission devices 12 or 13 which can be actuated by the engineer by a handle 10 or 11, and which for every situation can send appropriate braking requirement signals for the train 1 over the lines 14 or 15.

Friction brakes 16, 17, 18 and 19 are; allocated to the wheel sets 9 of the bogies 4 to 7, and each comprises a friction shoe 20 and a brake cylinder 21. Of course, friction brakes could also be allocated to the other wheel sets 8 of the bogies 4 to 7, wherein all friction brakes being in the form, not of shoe brakes as indicated in the drawing for the sake of simplicity, but of disk brakes. Friction brakes 16 to 19 form four brake groups 22, 23, 24 and 25, the pressure admission of each brake cylinder 21 being regulated by an adjustment valve 26, 27, 28, 29 allocated to each of the groups of brakes 22 to 25. The brake cylinders of the friction brake for the wheel sets 8 (not shown) can likewise be attached to the adjustment valve 26 to 29 of bogies 4 to 7, and in that case belong to the respective group of brakes 22 to 25. They can also, however, be equipped with their own adjustment valve (not shown) and form their own group of brakes.

As a variant of the embodiment described thus far, single or loose wheels can be provided whose brakes form brake groups which can be actuated separately. The adjustment valves 26 to 29 are each included in a pressure connection between a pressure source 30, shown in the drawing as an air reservoir, and the brake cylinder 21 of the respective group of brakes 22 to 25. They are actuated by braking signals over control lines 31, 32, 33 or 34, and, depending on their actuation with these brake signals, control the amount of pressure admitted to the respective downstream brake cylinder 21.

A control device 35 arranged in the individual car 2 comprises a microcomputer for signal processing and adjustment. The lines 14 and 15 lead to the control device 35 and conduct the braking requirement signals to it. In addition, the control lines 31 to 34 lead to the control device 35; they may be multiwired and on the one hand lead the braking signals separately produced in the control device 35 for the individual groups of brakes 22 to 25 to the adjustment valves 26 to 29, and on the other hand lead to the control device 35 the measurement signals corresponding to the brake pressures produced in the adjustment valves 26 to 29. Multiple wire measurement lines 36, 37, 38 or 39 lead to the control device 35 from the friction elements, shown in the drawing as the friction shoes 20 of the individual groups of brakes 22 to 25; these feed the measurement signals which are proportional to the temperature, amount of friction, and possible brake strength for the individual friction elements or friction shoes 20. It is useful to allocate to each bogie 4 to 7 of the single cars 2 and 3 a weighing device 40, 41, 42 or 43, which feeds appropriate signals on vehicle load to the control device 35 via additional measurement lines 44, 45, 46 or 47. In addition, impulse transmitters (not shown) can be allocated to each wheel set 8 and/or 9; these impulse transmitters feed measurement signals on the instantaneous revolutions of these wheel sets to the control device 35 via additional lines (also not shown). During braking and driving of the train 1, these measurement signals can be evaluated in the control device 35 in a known manner, such that the onset of locking or skidding can be determined and modified braking signals counteracting such locking or skidding can be introduced in the control lines 31 to 34.

When starting the train, for instance in dependence on the pressure build-up in the pressure sources 30, the control device 35 forms, from the measurement signals fed to it through the measurement lines 36 to 39 on the friction condition of the friction elements or friction shoes 20 of the individual groups of brakes 22 to 25, a priority sequence for the application of the groups of brakes, such that, upon subsequent introduction of a braking requirement signal, first the brake group 22, 23, 24 or 25 which shows the least wear is applied by actuation of a transmission device 12 or 13, and subsequently the remaining brake groups 22 to 25 are activated in order of increasing wear. The actuation of course does not take place at different times, but depending on the braking requirement signal, may be simultaneous such that the control device 35 first introduces a controlling braking signal leading to up to a high level braking into the control line 31, 32, 33 or 34 of the braking group 22 to 25 which has the least wear. This causes the adjustment valve 26 to 29 of this brake group 22 to 25 to admit a corresponding braking pressure from the pressure source 30 to the brake cylinder 21 of this group of brakes. If this introduction of a group of brakes 22 to 25 results in insufficient braking relative to the braking requirement signal, the control device 35 initiates a braking signal to actuate simultaneously, in the sequence of their increasing wear condition, a second, third, and if necessary, even the fourth group of brakes, such that the total braking effect corresponds to the braking requirement signal 14. The respective braking effect is determined in the control device 35 from the measurement signals led to the latter via the control lines 31 to 34, and corresponding to the respective brake pressures, and or fed over the measurement lines 36 through 39 and corresponding to the respective braking forces.

During the associated braking process, the friction elements or brake shoes 20 of the actuated groups of brakes 22 to 25 are heated by friction, whereby their friction effect changes; for these friction elements or friction shoes 20, that type of known friction material is used whose specific wear is at least within a temperature range of above about 100 to 200° C., up to at most above 250° C. At lower temperatures and at temperatures above the given temperature range, these materials sometimes have a significantly worse friction effect, i.e., greater specific wear with poor friction.

Let us assume that there is a partial braking for which a strong application of the least-worn group of brakes, e.g., 22, and a weaker application of the second-least worn group of brakes e.g., 24, would produce a total braking effect sufficient to respond to the braking requirement signal. By a strong application of the group of brakes 22, its friction elements or its friction shoe 20 would quickly achieve the most advantageous specific wear in the given temperature range; attainment of this temperature range is noted to the control device 35 by corresponding measurement signals in the measurement line 36. This then causes a reduction in the application force for the group of brakes 22 and an increase in the application force for the group of brakes 24, such that the latter, as well, quickly achieves the most advantageous specific wear in the above-mentioned temperature range. A change in the application forces for the groups of brakes 22 and 24 occurs in such a way, of course, that the total braking effect adequate to the braking requirement signal remains constant. If changes in the abrasion values on the friction elements or friction shoes 20 should occur because of changes in temperature, the measurement signals for braking force fed into the control device 35 through the measurement lines 36 and 38 change correspondingly, so that the control device 35 is caused to compensate for this change in abrasion values by a corresponding change in the braking signals in the control lines 31 and 33, such that the braking effect of the groups of brakes 22 and 24, and therefore the total braking effect, remains constant. Brake groups 23 and 25, which have the third and fourth-most wear, are not applied in this example.

Upon changes in the braking requirement signal by a corresponding adjustment in the transmission device 12 or 13, the application force of the most-worn, actuated group of brakes, brake group 24 in the example, is decreased or increased to moderate braking by the control device 35, and, if this is not sufficient, application of the next-most worn group of brakes 23 or 25 is made so that again an adequate total braking effect for the braking requirement signal results, it being assumed that the friction elements or brake shoes 20 of the brake group already applied with moderate strength (brake group 22 in the example) have minimal specific friction in the specified temperature range.

If the temperature on the friction elements or friction shoes 20 of a brake group applied with moderate strength, brake group 22 in the example, increases further during continuing braking so that it exceeds the specified temperature range, the application of this group of brakes, brake group 22 in the example, is decreased to the extent that the temperature again falls into the specified temperature range and stabilizes therein. However, the braking must not be so weak that it results in glazing of the friction elements or brake shoes; instead, the affected group of brakes can be fully turned off. By corresponding increase in the application of one of the other groups of brakes, or by initial application of a different group of brakes wherein the priority sequence dependent on wear condition is maintained, the total braking effect is kept constant, corresponding to the braking requirement signal. If the friction shoes 20 of the least-worn group of brakes, brake group 22 in the example, cool off to a temperature below the mentioned temperature range, the application of the group of brakes is again undertaken or is increased, while the application of a more worn group of brakes, brake group 24 or 23 in the example, is correspondingly decreased. Application of the other groups of brakes is also controlled so that the least possible wear in the temperature range is achieved and maintained.

After the release and possible cooling of the friction elements or friction shoes 20 of the friction brakes 16 to 19, their instantaneous wear condition is again processed in the control device 35 into a new priority sequence for application of the brake groups 22 to 25 corresponding to their wear condition; for the next braking this new priority sequence is followed for the application of the brake groups 22 to 25. But if a new braking should occur before the cooling of the friction elements or friction shoe 20, the individual groups of brakes 22 to 25 are applied corresponding to the original, first priority sequence. This assures that the friction elements or friction shoes 20 are operated as much as possible within the temperature range for minimum wear, i.e., that they undergo minimal wear.

Altogether, then, an auxiliary device for determining the wear condition of at least one, or, if necessary, several friction brakes 16 to 19 of each group of brakes 22 to 25 is provided, and the control device 35 is a selection device which gives the application of less-worn friction brakes in a group of brakes priority over application of more-worn friction brakes in a group of brakes. The priority or application sequence for the brake groups 22 to 25, also dependent on the instantaneous temperatures of the friction shoes 20 of the individual groups of brakes 22 to 25, are changed such that when the specified, predetermined temperature range is exceeded in the brakes of a preferably applied group of brakes, the actuation of such group of brakes is decreased or ended until they are cooled to within the temperature range, and instead the application of a group of brakes having a lower priority is begun or correspondingly increased.

The friction brakes 16 to 19 can be equipped with conventional wear detectors (not shown) to determine their instantaneous wear condition. In addition, the control device 35 can comprise an integration device which determines the wear of the friction elements or friction shoes 20 of the individual friction brakes 16 to 29 relative to the strength and duration with which they are applied in accordance with conventional standards for the measurement of wear, and thereby determines a theoretical instantaneous wear condition. The priority sequence for application of the individual groups of brakes 22 to 25 can be changed at the start of every braking on the basis of this theoretical wear condition after start-up of the braking device, during a change in the brake requirement signal or constantly, relative to the actual, theoretical wear condition. The measurement signals of the wear detectors can serve to correct the theoretical wear conditions to the actually existing wear conditions at larger time intervals, preferably conditional on start-up of the braking device or the vehicle or train, conditional on the beginning of brake application, or it can also be controlled by a clock at least once a day. Similarly, the control device 35 may comprise another integration device which determines the instantaneous temperatures of the friction brakes or their brake shoes 20 separately for the individual groups of brakes 22 to 25 according to conventional rules for measuring heating and cooling, taking into account the strength of application, by integration over time. Special temperature sensors on the friction brakes 16 to 19 can be omitted or they can, as mentioned earlier for the wear detectors, serve at specified points in time to correct the theoretically determined temperature values.

In a modification of the above-described mode of operation, the initial forceful application of a group of cool brakes can be omitted; the control device 35 can then be so constructed that it gives the braking signals for the individual groups of brakes to be actuated in such a way that these are always controlled at wear-advantageous, moderate brake strengths. However, this may somewhat delay the attainment of the best temperature range.

The control device 35 adjusts the braking signals to be controlled through the control lines 31 to 34 conditional on the braking requirement signal in the line 14 or 15, taking into account the loads of the individual bogies 4 to 7 or their wheel sets 8 and/or 9, given vehicle load signals fed to it from the weighing devices 40 to 43 via the measurement lines 40 to 47, in such a way that the train 1 is always braked correctly relative to its load. Of course, deviations from the correct application strength based purely on the vehicle load may frequently occur in the individual groups of brakes 22 to 25 as a result of the wear or temperature-dependent application control. Such deviations are completely compensated, however, if viewed over all groups of brakes 22 to 25 of the train. The measurement signals, fed through the measurement lines 40 to 47 and dependent on the vehicle load, can also assure that the application strength for each group of brakes is limited to a value below the application force which might cause wheel locking. Instead, or additionally, the control device 35 may comprise an electronic anti-skid device which is controlled by the revolution detectors, (already mentioned and not shown), and which causes the control device 35 to decrease the application on the affected group of brakes if skidding occurs, or to quickly interrupt the application in such a way that the skidding is halted and locking is avoided. In addition, if, during driving, spinning or slipping of individual sets of wheels is detected by the revolution detector, the associated brake group can be applied in a conventional manner, whereby the spinning is ended by braking.

It is further useful to construct the control device 35 in such a way that the braking signals are adjusted or changed with such limited change gradients that brake jerking does not exceed a predetermined limiting value, whereby good riding comfort results.

The control device 35 is also to be constructed so that it has an emergency brake function which causes the control device 35, during emergency braking, triggered for example, by actuation of an emergency brake box by passengers, to turn off the wear- and temperature-dependent limits and control devices, and to give the maximum braking signals to all the groups of brakes 22 to 25, limited at most by the vehicle load.

In a modification of the previously described embodiment, a relay valve (not shown) may of course be installed between the adjustment valves 26 to 39 and the respective downstream brake cylinders 21; this relay valve is controllable by a control valve of small throughflow cross section and which controls pressure admission of the brake cylinder with large throughflow cross sections. As needed, a conventional anti-skid valve, with the three positions "increase brake pressure", "hold brake pressure", and "decrease brake pressure", can be used as a control valve. Of course, a control order to "maintain brake pressure" from the anti-skid device can be overridden by a braking signal from the control device 35 to decrease the brake pressure in order to release the brake.

It is known that friction materials are destroyed when they reach a certain temperature limit; this temperature limit is of course higher than the previously mentioned temperature range, but it may be contiguous with the upper limit of the latter. It is useful to construct the control device 35 in such a way that it immediately and entirely turns off a group of brakes in whose friction brakes a friction element or friction shoe 20 has achieved the specified temperature limit, and then more strongly applies other groups of brakes which are not yet thermally fully over-loaded, or applies an as yet unapplied group of brakes. The thermally over-loaded friction brake can then cool off and recover.

Altogether, it should be assured that the friction brakes of the individual groups of brakes 22 to 25 are being operated by the control device 35 in such a way that, by avoiding thermal overloads for all braking elements or friction shoes 20, a similar wear condition is produced, i.e., at the final wear condition all friction shoes 20 are replaced without waste of unused friction material. This assures that the friction elements or friction shoes are operated in the most advantageous temperature range and pressure with respect to minimum wear, namely at moderate braking force. This results in on the whole less wear, which leads to long operational life of the braking device given the balanced use of all friction shoes 20, during which no friction elements or brake shoes 20 need be replaced. In addition, by avoiding weak braking, glazing of the friction materials is avoided so that no glazed friction materials or friction shoes have to be replaced, either, and the required braking force can always be achieved.

What is claimed is:

1. Braking device for a rail vehicle with a plurality of wheels (1), comprising friction brakes (16-19) associated with said wheels and divided into separately actuatable groups of brakes (22-25) with control means (35) which processes a braking requirement signal for use as braking parameters for said rail vehicle (1), measurement signals for temperature and friction and/or braking pressure of at least one friction brake (16-19) of each said group of brakes (22-25) and from these adjusts individual braking signals for individual groups of brakes (22-25) controlling the force of brake application of said groups, such that, by selection of brakes to be applied and the force with which brakes so selected are applied, a predetermined temperature limit for each group of brakes (22-25) is observed and a total braking effect corresponding to a braking requirement signal as the sum of braking effects of individual groups of brakes (22-25) is simultaneously achieved, wherein (a) said friction brakes (16-19) are provided with friction materials which, within a determined temperature range above about 100° C., have minimum specific wear values; and (b) said control device (35) produces said braking signals at least during an uninterrupted period of braking, such that a temperature at most up to the temperature limit of the temperature range is attained and maintained in said friction brakes (16-19) of all applied groups of brakes (22-25), and weak brake applications leading to glazing of said friction materials are avoided.

2. Braking device according to claim 1, wherein each said group of brakes (22-25) comprises at least said friction brakes (16-29) of two wheels (8; 9) on a same axle, preferably of all wheels of one bogie (4 to 7) or of all wheels of a rail vehicle.

3. Braking device according to claim 1 or 2, wherein said friction brakes (16 to 19) are adapted to be stroked by said brake cylinder (21), and wherein admission of pressure to brake cylinders (21) of every group of brakes (22-25) is controlled by a relay valve of an adjustment valve (26-29) which is itself controlled by said braking signals.

4. Braking device according to claim 3, wherein said adjustment valve (26-29) is an anti-skid valve having "increase brake cylinder pressure", "maintain brake cylinder pressure", and "decrease brake cylinder pressure" positions.

5. Braking device according to any one of claims 1, 2 or 4, comprising an auxiliary device for determining the wear condition of at least one friction brake (16-19) of every group of brakes (22-25), and said control device (35) contains a selection device which gives priority to the application of a group of brakes (22-25) having less-worn friction brakes (16-19) over a group of brakes having more strongly worn friction brakes.

6. Braking device according to claim 5, wherein said auxiliary device comprises wear detectors attached to said friction brakes (16-19) and sending wear measurement signals to said control device (35).

7. Braking device according to claim 5, wherein said control device (35) comprises an integration device which determines an instantaneous wear condition by integration of corresponding wear parameters conditional on braking force over application time.

8. Braking device according to claim 7, wherein said wear detectors are activated for short periods only at large time intervals, at the beginning of braking or, if controlled by a clock, at least once a day, to send wear measurement signals which effect a correction of an instantaneous wear condition determined by said integration device.

9. Braking device according to claim 8, wherein said control device (35) produces a priority application sequence, dependent on wear, for groups of brakes (22–25) upon the appearance of wear measurement signals, which priority application sequence depending on the instantaneous temperatures on said friction brakes (16–19) of the individual groups of brakes (22–25) is adapted to be changed in such a way that, if the temperature on said friction brakes (16–19) of a preferably-applied group of brakes (22–25) exceeds said predetermined temperature range, the application of said preferably-applied group of brakes is discontinued until it has cooled tow thin said predetermined temperature range, and instead the application of a group of brakes to be applied subsequently is begun or increased accordingly.

10. Braking device according to any one of claims 1, 2, 4 or 6 to 8, wherein the control device (35) comprises an integration device which determines the instantaneous temperature of said friction brakes (16–19) of said individual groups of brakes (22–25) in accordance with conventional warming and cooling measurement by integration over time.

11. Braking device according to any one of claims 1, 2, 4 or 6 to 8, wherein said control device adjusts the braking signals for the individual groups of brakes (22–25) in such a way that wear-advantageous, medium braking strengths are preferably introduced to said groups of brakes (22–25).

12. Braking device according to any one of claims 1, 2, 4 or 6 to 8, wherein said control device (35) adjusts the braking signals in such a way that the braking force of each said group of brakes (22–25) is limited to a value below a braking force that would enable wheel locking.

13. Braking device according to any one of claims 1, 2, 4 or 6 to 8, wherein said control device (35) adjusts the braking signals with such limited change gradients that braking jerks occur on said rail vehicle (1) only up to a predetermined limit.

14. Braking device according to any one of claims 1, 2, 4 or 6 to 8, wherein said control device (35) comprises an emergency brake device, which, when emergency braking occurs, switches said control device from wear or temperature-dependent limits to sending brake signals causing maximum braking.

* * * * *